United States Patent
Lawson et al.

(10) Patent No.: US 10,126,540 B2
(45) Date of Patent: Nov. 13, 2018

(54) FOCUSING SYSTEM FOR A TELECENTRIC OPTICAL MEASURING MACHINE

(71) Applicant: Quality Vision International, Inc., Rochester, NY (US)

(72) Inventors: David E. Lawson, Webster, NY (US); Stephanie M. Bloch, Penfield, NY (US)

(73) Assignee: Quality Vision International, Inc., Rochester, NY (US)

( * ) Notice: Subject to any disclaimer, the term of this patent is extended or adjusted under 35 U.S.C. 154(b) by 207 days.

(21) Appl. No.: 15/299,523

(22) Filed: Oct. 21, 2016

(65) Prior Publication Data
US 2017/0168282 A1    Jun. 15, 2017

Related U.S. Application Data

(60) Provisional application No. 62/264,924, filed on Dec. 9, 2015.

(51) Int. Cl.
*G02B 21/36* (2006.01)
*G06T 7/00* (2017.01)
(Continued)

(52) U.S. Cl.
CPC ............ *G02B 21/365* (2013.01); *G01B 11/02* (2013.01); *G02B 7/08* (2013.01); *G06T 7/0044* (2013.01); *H04N 5/23212* (2013.01)

(58) Field of Classification Search
CPC ........ G01B 11/02; G02B 21/365; G02B 7/08; G06T 7/0044
See application file for complete search history.

(56) References Cited

U.S. PATENT DOCUMENTS

| | | |
|---|---|---|
| 3,603,833 A | 9/1971 | Logan et al. |
| 4,079,248 A | 3/1978 | Lehureau et al. |

(Continued)

FOREIGN PATENT DOCUMENTS

| | | |
|---|---|---|
| DE | 3822275 A1 | 3/1989 |
| JP | 2011169661 A | 9/2011 |

(Continued)

OTHER PUBLICATIONS

Kopeika, et al., "Wavelength tuning of GaAs LED's through surface effects", Abstract, IEEE Transactions on Electron Devices, vol. ED-30, Apr. 1983, p. 334-347.
(Continued)

*Primary Examiner* — Edward Park
(74) *Attorney, Agent, or Firm* — Thomas B. Ryan, Patent Agent; Harter Secrest & Emery LLP

(57) ABSTRACT

A method of focusing a telecentric imaging system (30), particularly as a part of a measuring machine (10) includes measuring an image of a feature (25) of an object (24) through the telecentric imaging system (30) in a telecentric operating mode and measuring an image of the feature (25) of the object (24) through the telecentric imaging system (30) in a non-telecentric operating mode. A value is acquired characterizing a function by which the size of the imaged feature varies in the non-telecentric mode with the relative displacement of the object (24) through the depth of field (D). The measures of the image of the feature (25) of the object (24) in the telecentric and non-telecentric modes are related to each other and to the acquired value as an estimate of a relative displacement of the object (24) from the best focus position.

31 Claims, 3 Drawing Sheets

(51) Int. Cl.
*G01B 11/02* (2006.01)
*G02B 7/08* (2006.01)
*H04N 5/232* (2006.01)

(56) References Cited

U.S. PATENT DOCUMENTS

| | | |
|---|---|---|
| 5,758,644 A | 6/1998 | Diab et al. |
| 5,831,715 A | 11/1998 | Takahashi |
| 7,812,971 B2 | 10/2010 | Jackson et al. |
| 7,846,624 B2 | 12/2010 | Smith et al. |
| 2007/0280664 A1 | 12/2007 | Ikeda |
| 2014/0370719 A1* | 12/2014 | Komine ............... G03F 9/7026 438/795 |
| 2016/0000535 A1* | 1/2016 | Atiya .................... A61C 1/088 433/29 |

FOREIGN PATENT DOCUMENTS

| | | |
|---|---|---|
| JP | 2011224755 A | 11/2011 |
| WO | 96/41138 A1 | 12/1996 |
| WO | 03/055232 A1 | 7/2003 |

OTHER PUBLICATIONS

Kaufmann, et al., "Elimination of color fringes in digital photographs caused by lateral chromatic aberration", CIPA 2005 XX International Symposium, Sep. 26-Oct. 1, 2005, Torino, Italy.
LED Technical Specifications and Application Notes, http://TheLEDLight.com/technical1.html.
International Search Report and Written Opinion from corresponding International Application No. PCT/US2016/058029.

* cited by examiner

FOCUSING SYSTEM FOR A TELECENTRIC OPTICAL MEASURING MACHINE

TECHNICAL FIELD

The invention relates to focusing systems for telecentric imaging systems, used for example in image-based measuring machines, and to techniques for estimating positions of best focus based on measurements taken through the telecentric imaging systems.

BACKGROUND OF THE INVENTION

In imaging systems, image sharpness can vary with departures from the best focus position. As such, the best focus position of imaging systems is often determined by moving the position of the object relative to the imaging system until the sharpest image is formed. Typically, image contrast is used as a measure of sharpness to identify the best focus position at the peak contrast.

U.S. Pat. No. 7,812,971, which is assigned in common with this application, features an autofocus system for a machine vision system that scans along an optical axis collecting a plurality of image frames at a plurality of different wavelengths to determine the positions of maximum contrast for each wavelength. The maximum contrast measurements can be combined based on the expected displacements among the wavelengths to determine a position of best focus. Alternatively, contrast measurements for the different wavelengths at a single axis position can be fit to the contrast value plots of the different wavelengths over a range of axis positions for identifying the best focus position.

In optical systems with large depths of field, e.g., having a large f-number, the variations in sharpness in the vicinity of the best focus position tend to be more gradual, which reduces the accuracy and precision with which the best focus position can be found. Departures from the best focus positions can often be tolerated for optical systems with large f-numbers because the variation in sharpness is so gradual. However, in such systems that are arranged to switch between magnifications, the departure from best focus workable at a lower magnification can be beyond the depth of field at a higher magnification, leaving no measurable image from which a further focus adjustment can be made. Making separate focus adjustments between low and high magnification imaging can be time consuming and add variability between the measurements.

Measures of contrast, which often involve pixel-to-pixel intensity comparisons, differ from the usual measures for which the measuring machines are designed and require additional processing algorithms and other capabilities. Unless the object subject to imaging is matched to a given choice of algorithm, the efficacy of the contrast measurement can vary considerably. Thus, inconsistent focusing results can be associated with a range of different objects that are the subject of the intended measurement.

SUMMARY OF THE INVENTION

Among the embodiments described is a focusing system for an optical measuring machine having a telecentric imaging system. Preferably, the focusing system operates substantially independently of the f-number or depth of field of the telecentric imaging system. For purposes of focusing, the telecentric imaging system is operated in a non-telecentric mode, such as by inducing chromatic aberration, and one or more associated measures of distortion are converted into a measure of object displacement from the best focus position. The telecentric imaging system in its usual mode of operation is arranged for measuring the sizes of features of objects as imaged within an image field, and distortion in the non-telecentric mode can also be measured as changes in feature size within the image field. Thus, the regular measuring capabilities of the measuring machine can be exploited for determining the best focus position.

For inducing the chromatic aberration, the illuminator of the optical measuring machine is preferably operated at a wavelength that is outside the range of wavelengths at which the telecentric imaging system is corrected. Within the wavelength range at which the telecentric imaging system is corrected, the imaging system exhibits telecentric behavior at least with respect to object space. Wavelengths beyond the range at which the telecentric imaging system is corrected introduce chromatic aberrations and corresponding departures from telecentricity. For example, an axial component of chromatic aberration changes the focal lengths of optics within the telecentric imaging system such that the aperture stop of the telecentric imaging system is no longer located at the back focus as required to locate the entrance pupil at infinity. While a lateral component of chromatic aberration also tends to change the magnification, more significantly for the purposes herein, magnification also varies with object distance as a result of the departure from telecentricity. The effects of the departure in wavelength tend to remain radially symmetric, and as such, the effects can be defined as a function of distance from the center of the image field or optical axis. The changes in magnification can be referred to more generally as changes in distortion to encompass both the first order change in magnification and higher order changes in magnification with distances from the field center. The higher order changes in magnification can affect imaged feature shape in addition to imaged feature size.

Preferably the wavelength at which the measuring machine is operated in a non-telecentric mode is still sufficiently close to the range of wavelengths at which the telecentric imaging system is designed to operate so that the primary effect is a displacement of image points within the image field, classifiable as a radial distortion, without also resulting in a loss in sharpness affecting the ability to measure image feature size. While sharpness could vary somewhat through the depth of field as a function of the object distance from the best focus position, imaged points and edges preferably remain sufficiently sharp so that measurements of image height can be made throughout an overlapping depth of field in both the telecentric and non-telecentric modes.

Consistent with the fundamental expectations of telecentricity, image height remains substantially constant through the depth of field. In other words, magnification does not significantly vary with object distance through the depth of field. Thus, regardless of the object position in the depth of field, i.e., the object's relative departure from the best focus position, substantially the same image height is measured by the optical measuring machine operating in its telecentric mode.

In contrast, measurements of image height taken with a wavelength beyond the range of correction, tend to vary first as a result of a lateral chromatic aberration evident as an initial change in magnification even at the best focus position, and second, more significantly, as a result of an axial chromatic aberration resulting in a departure from telecentricity evident as a further variation in magnification as a function of the object's relative departure from the best focus position.

Thus, the image height of a measured object remains substantially invariant with departures from the best focus position of the optical measuring machine operating in the telecentric mode. However, the image height of the same measured object varies as a function of departures from the best focus position of the optical measuring machine operating in the non-telecentric mode.

The two measures of image height can be correlated in various ways to estimate the object's relative departure from the best focus position. For example, a first measure of image height can be taken in the telecentric mode to establish a baseline image height, which is expected to remain constant regardless of the position of the object within the depth of field. A second measure of image height can be taken at the same position of the object within the depth of field but in the non-telecentric operating mode, and a first height difference between the telecentric and non-telecentric measurement modes can be recorded. While remaining in the non-telecentric operating mode, a third measure of image height can be taken at a relatively displaced position of the object within the depth of field. The amount of displacement can be predetermined or measured. A second height difference between the telecentric first measurement and the non-telecentric third measurement can be recorded. Given the two height differences over a known displacement, a first linear approximation of the further relative displacement of the object to the best focus position can be determined where the height difference between the telecentric and non-telecentric measures is reduced to zero. The linear approximation reflects an expected proportional change in local magnification with object displacement through the depth of field.

A better approximation of the object displacement from the best focus position can be obtained by accounting for the change in image height associated with the lateral component of the chromatic aberration, which changes the magnification at the best focus position. Thus, instead of solving for a displacement at which the difference between the telecentric and non-telecentric measurements reduces to zero, the linear approximation can include an offset representing the difference in image height expected at the best focus position. However, where the departure from telecentricity is effected by a wavelength shift just beyond the corrected range of wavelengths, the difference in image height between the two modes at the best focus position is expected to be minimal and in many instances can be ignored.

For a given telecentric imaging system and a given wavelength outside the range of correction for operating the telecentric imaging system in a non-telecentric mode, local values of distortion can be predicted or measured throughout the image field and over the depth of field. Assuming radial symmetry, the distortion values only need to be taken over a domain of image heights as radial distances from the field center. While distortion can be represented in a variety of ways, the distortion values can be presented as percentages calculated by the difference in object height between the telecentric and non-telecentric modes ($h_1-h_0$) divided by the object height of the telecentric mode ($h_0$). A single percentage can represent changes in magnification that do not vary throughout the image field. Discrete distortion values can be associated with different image heights or a distortion curve can also be fit to the values.

Assuming that the distortion at any particular image height varies proportionally to the relative displacement of the object through the depth of field, then the change in distortion at each image height over a change in displacement along the depth of field can be represented by a single rate or slope. Since a change in the distortion at any point in the image field can be represented as a local change in magnification $$\left(\frac{h_2}{h_0} - \frac{h_1}{h_0}\right),$$

the rate or slope corresponds to a change in magnification with respect to a change in object displacement. In addition, each image height can also be associated with a magnification offset attributable to the lateral chromatic aberration, which could remain approximately constant over the image field or vary with field position representing a higher order change in magnification.

Having characterized the distortion effects of the non-telecentric mode throughout the field of view and over the depth of field, a single pair of measurements taken in the telecentric and non-telecentric modes at a particular image height and object displacement can be associated with a predicted or previously measured slope, corresponding to the expected rate of change of the local magnification with relative object displacement, and, if desired, the pair of measurements can be further associated with a local magnification offset associated with the lateral component of the chromatic aberration, to estimate an amount of displacement to the best focus position. That is, by measuring the relative magnification contributed by the non-telecentric mode at a measured image height and knowing both the rate of change of the local magnification with object displacement and the expected local magnification offset at the best focus position, a close estimate can be made of the object displacement required to reach the best focus position.

As a range finder or first approximation, an average slope value, representing the rate of change in magnification with object displacement within the depth of focus can be predicted from modeling or can be empirically determined. That is, although the actual rate may vary with radial position in the field due perhaps in part to higher order distortion effects, an average slope value together with a single pair of measurements in the telecentric and non-telecentric modes can provide an estimate of the object displacement from the best focus position. While this estimate may be of sufficient accuracy in certain applications to effect a final focus adjustment or to determine an approximate distance of the object, the estimate could also be used as a first stage of focus adjustment.

After relatively displacing the object by the estimated amount, another non-telecentric measurement of image height can be made. Now, with two measures of object feature height taken in the non-telecentric mode over a known range of object displacement together with the base measurement taken in the telecentric mode, a more accurate determination of the rate of change of object height difference with displacement (representative of the change in magnification with respect to the change in displacement) can be calculated as described above. The first approximated relative displacement places the object much nearer to the best focus position, and the more accurately measured slope following the first displacement can be used to more finely estimate a further relative displacement to relatively move the object closer to the best focus position.

If desired, the process of taking additional non-telecentric measurements and relatively adjusting the object position can be repeated until the non-telecentric measurement of image height approaches the telecentric measurement of image height by any difference of the offset expected as a result of lateral chromatic aberration.

An embodiment as a method of measuring a best focus position of a telecentric imaging system includes measuring an image of a feature of an object through the telecentric imaging system in both a telecentric operating mode and a non-telecentric operating mode. The size of the imaged feature remains substantially constant with relative displacement of the object through a depth of field in the telecentric mode. However, in the non-telecentric mode, the size of the imaged feature varies as a function of the relative displacement of the object through the depth of field. The measures of the images of the feature of the object in the telecentric and non-telecentric modes are related to each other and to the function by which the size of the imaged feature varies with the relative displacement of the object through the depth of field as an estimate of a relative displacement of the object from the best focus position.

Another embodiment as method of focusing a telecentric imaging system includes both measuring an image of a feature of an object through the telecentric imaging system in a telecentric operating mode in which a size of the imaged feature remains substantially constant with relative displacement of the object through a depth of field and measuring an image of the feature of the object through the telecentric imaging system in a non-telecentric operating mode in which the size of the imaged feature varies as a function of the relative displacement of the object through the depth of field. A value characterizing the function by which the size of the imaged feature varies with the relative displacement of the object through the depth of field can be acquired in various ways, including as a result of modeling the expected behavior of the telecentric imaging system or as a result of earlier measurements. The measures of the image of the feature of the object in the telecentric and non-telecentric modes can be related to each other and to the acquired value characterizing the function by which the size of the imaged feature varies with the relative displacement of the object through the depth of field as an estimate of a relative displacement of the object from the best focus position. The object can be relatively displaced with respect to the telecentric imaging system by the estimate of the relative displacement of the object from the best focus position.

DETAILED DESCRIPTION

Certain embodiments are particularly applicable to telecentric large-field-of-view optical systems and to such systems having large depths of field, e.g., using lenses having high f-numbers. For example, particular embodiments contemplate depths of field of 100 mm or more. Within such depths of field, image sharpness, such as might be measured by contrast, varies gradually through the depth of field, particularly near the best focus position, so that the peak sharpness (e.g., highest contrast) of the best focus position is difficult to distinguish from nearby positions.

A focusing method as described herein does not rely on measures of image sharpness to identify the best focus position. Instead, conventional image height or size measurements are taken of an object feature as seen through a telecentric imaging system that can be operated in both telecentric and non-telecentric modes. In the telecentric mode, the image height or size of the feature does not significantly vary through the depth of field. That is, in accordance with the regular expectations of a telecentric imaging system, magnification does not significantly vary with object distance within the depth of field. As such, the object feature is imaged by the telecentric imaging system at substantially the same image height regardless of the position of the object within the depth of field.

In the non-telecentric mode, the special requirements for telecentricity are not met and magnification tends to vary with object distance. However, the departure from telecentricity is not intended to significantly reduce the local sharpness of the image. Beyond the normal expectations regarding changes in magnification, image information is largely geometrically displaced rather than lost, and the geometric displacement, which varies as a function of object distance through the depth of field, can be measured as a clue to the best focus position. Even though local magnification changes with object distance in the non-telecentric mode, the varying height or size of the object feature within the image field preferably remains similarly measurable throughout substantially the same depth of field present in the telecentric mode. Any substantial differences between the two modes are preferably limited to the ends of the depth of field, where sharpness has substantially deteriorated.

Figure 1:
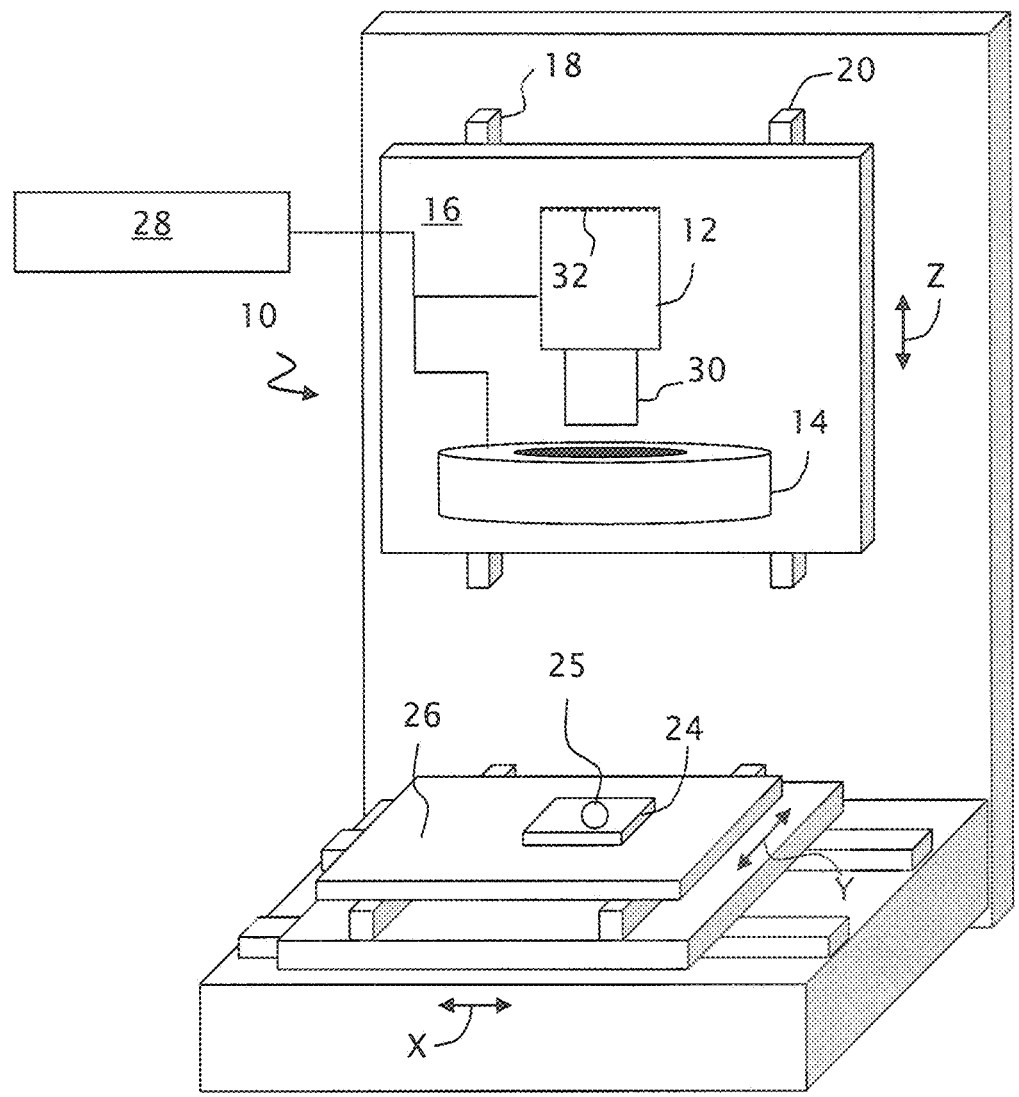
FIG. 1 is a diagrammatic view of a machine vision system implementing the autofocus apparatus and method of this invention.

Referring now to FIG. 1, a measuring machine in the form of machine vision system indicated generally at 10 includes a camera 12 and an illuminator 14 mounted on a carriage 16, which is moveable along a vertical Z-axis on slides 18 and 20 as shown by arrow Z. The illuminator 14 is shown as a ring light having a central aperture through which images are acquired and a surrounding annulus containing a plurality of light sources, which are not individually shown. For example, the illuminator 14 can contain selectively actuable, essentially monochromatic light sources, such as a plurality of LED's (light-emitting diodes) for illuminating an object 24 with monochromatic light.

The carriage 16 carrying the camera 12 is translatable along the Z-axis to adjust distance between the camera 12 and the object 24. The object 24, which is mounted on table 26, is similarly translatable along orthogonal horizontal axes X and Y to align different portions of the object with the field of view of the camera 16. Thus, the depicted measuring machine 10 includes three axes of linear motion for moving the camera 12 and the object 24 relative to each other. Similar results can be obtained by dividing the axes differently between the camera 12 and the object 24. In fact, one of the camera 12 and the object 24 can be stationary and the other of the camera 12 and the object 24 can be movable along any or all of the axes of motion. Although three rectilinear axes of motion are shown, the axes can be oriented differently and one or more rotational axes can be added or substituted to provide additional orientations between the camera 12 and the object 24 as required for measuring or otherwise imaging features of the object 24.

The camera 12 includes a telecentric imaging system 30, which is preferably in the form of a telecentric lens, which relays an image of the object 24 to a sensor 32 located in an image field of the telecentric imaging system 30. The sensor 32 can be a pixilated sensor such as a CCD (charge-coupled device) sensor. The telecentric imaging system 30 is preferably designed to reproduce an image of the object in a given wavelength with limited aberrations to support measurements of the object 24 with a desired accuracy. In addition, the telecentric imaging system 30 is designed to be telecentric for the given wavelength at least in an object space within a depth of field at which features of the object, such as the feature 25, are reproduced with adequate definition for measuring the image height or size of the feature with good precision (i.e., the measures are repeatable to within a given tolerance).

Image height can be measured along a radius from the center of the field and image size can be measured between any two points in the field. Knowing the center of the field, image height can be measured from the position of a single point in the field and can be more readily scaled or otherwise accommodated to radial distortions. A processor 28, which communicates with the camera 12, the illuminator 14, and the machine axes of motion (e.g., displacement commands and measurements along the X, Y, and Z axes), regulates sequences of operations including extracting size measurements of the imaged feature 25 from images captured by the detector 32 at two or more relative positions along the Z-axis of motion.

The illuminator 14 can be arranged to support various forms of imaging from brightfield imaging, where light specularly reflected from the object 24 enters the camera, to darkfield imaging where light must be non-specularly reflected from the object to enter the camera. LEDs within the illuminator 14 can be powered or controlled individually or in groups or sectors, and the LEDs can be separately or collectively associated with one or more lenses, such as a Fresnel lens to focus or otherwise angularly direct their light toward the object 24.

Other illumination techniques could also be used including various types of oblique or axial illumination as well as illuminators positioned for through-the-lens illumination in which light from an illumination source passes through an objective lens of the telecentric imaging system 30. Backlighting could also be used such as for measuring the silhouette of the object 24.

Preferably, the light source is substantially monochromatic having a nominal or peak wavelength for which the telecentric imaging system 30 is properly corrected to exhibit the desired level of sharpness and telecentricity. In addition, the light source is preferably adjustable for varying the peak wavelength emitted by the light source. For example, the electrical current to the LEDs within the illuminator 14 can be adjusted to shift the peak wavelength beyond the range at which the telecentric imaging system is corrected for maintaining telecentricity. Although the amount of wavelength shift with a change in current can vary for different LED designs, a given change in wavelength can produce a predictable and repeatable change in wavelength for a given LED design. Even small shifts in peak wavelength in the range of 10 nanometers (nm) can significantly alter the behavior of telecentric imaging system such that the system no longer behaves in a telecentric manner. That is, the measured image height of an object feature, such as the feature 25, illuminated by peak wavelengths within the corrected range remains substantially constant through the depth of field of the telecentric imaging system 30. However, the measured image height of the same object feature illuminated by peak wavelengths outside the corrected range varies as a generally linear function of object distance through the depth of field of the telecentric imaging system 30. From the perspective of a filled aperture, the centroid of energy through any one image point in the non-telecentric mode tends to extend at a fixed incline to the substantially axially aligned centroid in the telecentric mode.

In a practical sense, telecentricity varies over a continuum accommodating some tolerance for a minimal change in magnification over the depth of field. Preferably, the telecentric imaging system 30 is at least as telecentric as necessary for purposes of its intended operation as a part of the measuring machine 10. In addition, the image results of the telecentric imaging system 30 can be calibrated, such as by measuring reticle projections at different object positions to compensate for anticipated telecentric errors. The non-telecentric mode can be referenced with respect to the telecentric mode as a either a reduction in telecentricity or an increase in non-telecentricity whereby magnification varies to a more significant degree over the depth of field. That is, in the telecentric mode, the telecentric imaging system 30 meets the telecentricity requirements of the optical system, and in the non-telecentric mode, the telecentric imaging system 30 deliberately does not meet the telecentricity requirements of the optical system. Larger departures in telecentricity between the telecentric and non-telecentric modes can increase the accuracy by which relative object displacements to the best focus position can be estimated but the departures are preferably limited to avoid other unnecessary aberrations.

Figure 2A:
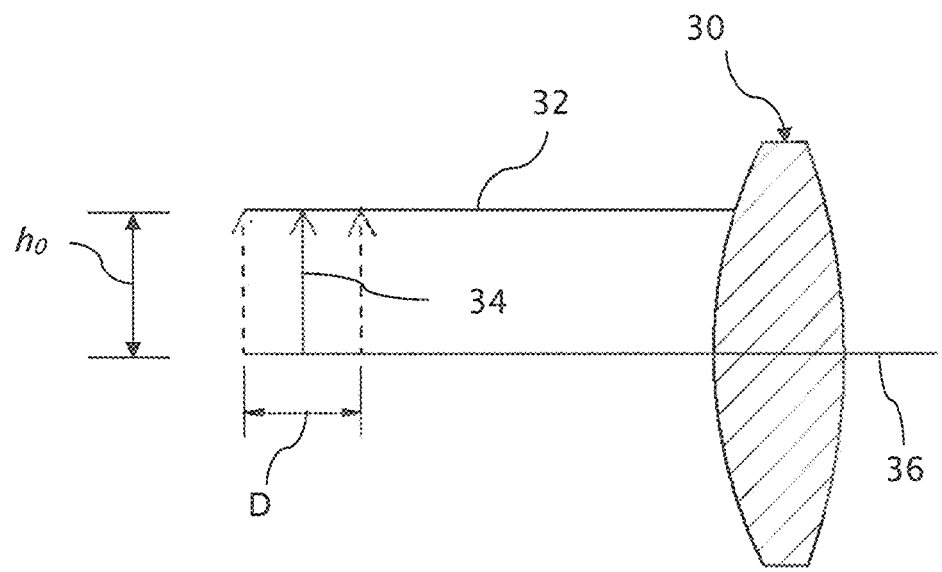
FIG. 2A is a diagram of an imaging system operating in a telecentric mode.

FIG. 2A provides a schematic depiction of the telecentric imaging system 30 operating in a telecentric mode in which the chief ray 32 from the highest point on a feature 34 (such as the feature 25) intended for imaging extends substantially parallel to the optical axis 36. The feature 34, which is shown in solid line at the nominal focus position and in broken lines at opposite ends of the depth of field D, remains at the same height $h_0$ throughout the depth of field D. That is, the height of the feature 34 as the feature 34 is thereby imaged does not significantly vary through the depth of field D in which the feature 34 can be imaged with a desired level of sharpness.

Figure 2B:
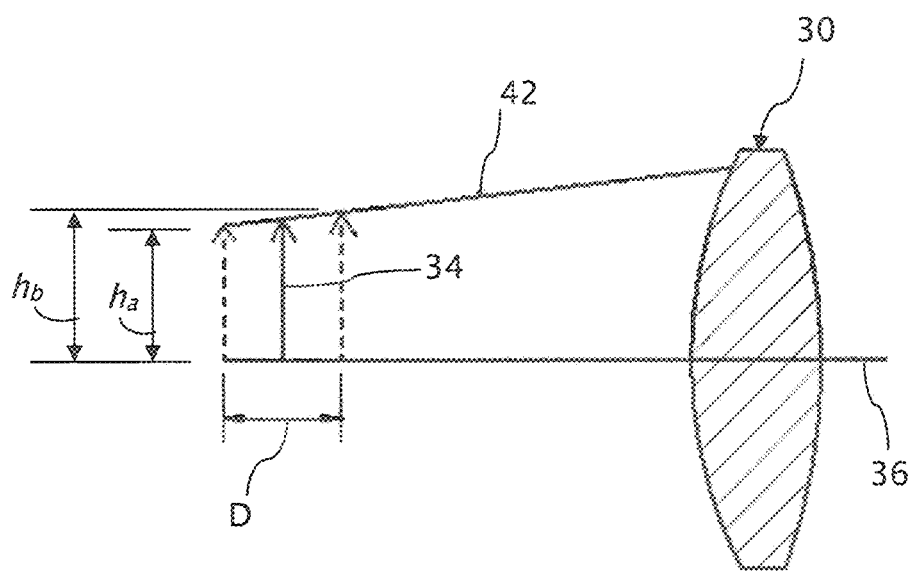
FIG. 2B is a diagram of an imaging system operating in a non-telecentric mode.

FIG. 2B provides a schematic depiction of the telecentric imaging system 30 operating in a non-telecentric mode in which the chief ray 42 from the highest point on the feature 34 intended for imaging extends at an incline to the optical axis 36. As shown, the height of the feature 34 as the feature is thereby imaged varies from a height $h_a$ to a height $h_b$ through the depth of field D in which the feature 34 can be imaged with a desired level of sharpness.

The telecentric imaging system 30 arranged for operation in the non-telecentric mode via a peak wavelength of illumination outside the corrected range generally subjects imaging to a chromatic aberration having an axial component in which the chief rays are focused at a different distance along the optical axis and a lateral component in which image points are focused in different positions within the image field, thereby affecting magnification and/or a higher order form of radial distortion. Particularly for this purpose, the telecentric imaging system 30 includes at least one lens having refractive index that varies as a function of wavelength, resulting, inter alia, in a change in focal length. The aperture stop of the telecentric imaging system 30 operating at a peak wavelength outside the corrected range is no longer located at the back focus as required to locate an entrance pupil of the imaging system at infinity. Thus, the image height or the size of a feature within the image tends to vary with object distance through the depth of field, as would be expected for an entocentric lens. Even at an ideal focus position, a slight change in the magnification and/or higher order distortion can be expressed by the lateral component of the chromatic aberration.

While the images produced in the non-telecentric mode can include, in addition to a change in magnification, higher order distortion, particularly radial distortion, the variation in image height with object distance at any point in the image field tends to remain linear. If the lateral component of chromatic aberration is small enough to be ignored, then an approximation of the best focus position can be predicted from a difference in the measured image height of a feature and the expected rate at which the change in image height varies with changes in object distance to identify an amount of object displacement through the depth of field required to reduce the change in image height to zero. To incorporate the effects of lateral chromatic aberration, the target change in image height can depart from zero to accommodate an expected amount of magnification at the best focus position from the peak wavelength outside the corrected range. Radial measures of image height as a measure of size avoid some of the complexities associated with higher order distortion affecting distance measurements between other pairings of points in the image field and their relative rates of change with object distance in the non-telecentric mode.

One approach to finding the best focus position includes measuring a feature size, particularly as an image height, while operating the measuring machine in a telecentric mode in which the illuminator is operated at a peak wavelength within the corrected range. Image height $h_0$ can be measured from the center of the field to a given point on an object feature, such as the feature 25. The measurement of image height $h_0$ must be taken within the depth of field of the telecentric imaging system 30 at which the image height of the feature 25 can be measured to desired accuracy and precision. While the object 24 is located at the same position within the depth of field, the telecentric imaging system 30 can be operated in a non-telecentric mode to take a second measurement of image height $h_1$ from the center of the field to the given point on the feature 25. Preferably the change in mode from telecentric to non-telecentric is effected by a change in the peak wavelength of the illuminator from a peak wavelength within the corrected range to a peak wavelength slightly outside the corrected range. Although image formation is demonstrably non-telecentric, image sharpness is preferably not significantly degraded over a substantially overlapping depth of field.

A height difference $\Delta h_1$ between the measured image height $h_1$ in the non-telecentric mode and the measured image height $h_0$ in the telecentric mode provides a local measure of the distortion caused by the changed wavelength. As a percentage, the local distortion can be represented as 100× ($\Delta h_1/h_0$). A second measure of image height $h_2$ in the non-telecentric mode can be taken of the same feature 25 at a relatively displaced position of the object 24 within the depth of field along the Z axis coincident with the optical axis of the telecentric imaging system 30. Either the object 24, the telecentric imaging system 30, or both can be moved relative to the other to displace the object 24 with respect to the telecentric imaging system 30 from a first position $Z_1$ at which the first measurements were taken to a second position $Z_2$ by a predetermined, measured, or otherwise known amount. Since the measured image height $h_0$ taken in the telecentric mode is not expected to change between the $Z_1$ and $Z_2$ positions, a height difference $\Delta h_2$ between the measuring modes at the displaced $Z_2$ position corresponds to the difference between the measured image height $h_2$ in the non-telecentric mode at the $Z_2$ position and the measured image height $h_0$ in the telecentric mode at the initial $Z_1$ position. A rate of change $m_r$ in image height with respect to a change in object distance is given as follows:

$$m_r = \frac{h_2 - h_1}{Z_2 - Z_1} = \frac{\Delta h_2 - \Delta h_1}{Z_2 - Z_1} \tag{1}$$

where the subscript "r" references a radial position within the object field corresponding to the image height $h_0$.

Figure 3:
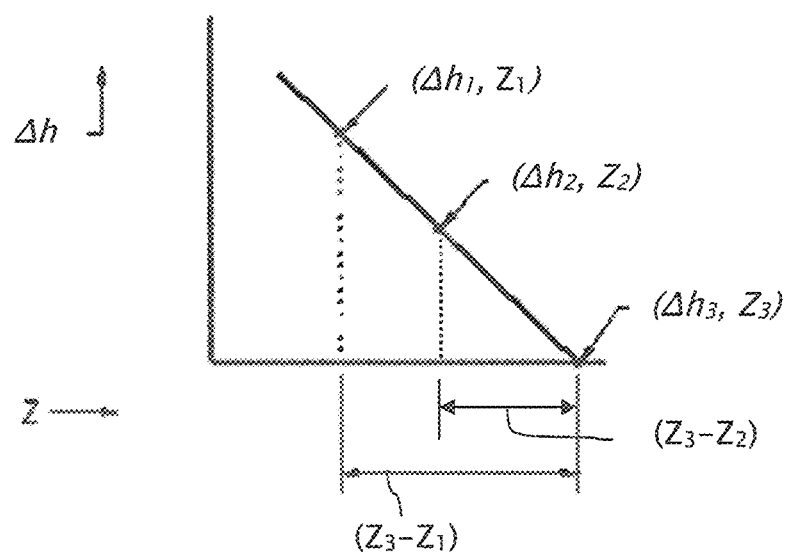
FIG. 3 is a graph showing image height differences between the telecentric and non-telecentric modes over a range of displacements of an object with respect to the telecentric imaging system within a depth of field.

Graphically depicted as a linear relation, FIG. 3 shows how a further relative displacement of the object 24 through a distance $Z_3-Z_2$ from the position $Z_2$ to a position $Z_3$ at which the difference in measured image height between the telecentric and non-telecentric modes is projected to equal zero can be found from the following relationship:

$$Z_3 - Z_2 = \frac{-\Delta h_2}{m_r} \tag{2}$$

An estimate of the distance $Z_3-Z_1$ from the position $Z_1$ to the position $Z_3$ can be similarly found from the following relationship:

$$Z_3 - Z_1 = \frac{-\Delta h_1}{m_r} \tag{3}$$

The slope $m_r$ can be normalized to a slope M by dividing the slope $m_r$ by the initial height $h_0$ measured in the telecentric mode. Any change in M throughout the image field in the non-telecentric mode is attributable to higher order distortion. For calculating the required displacement such as between $Z_1$ and $Z_3$ using the slope M, the image height difference $\Delta h_1$ can also be normalized by dividing by $h_0$ as a percent distortion.

By way of example, the telecentric imaging system 30 is considered corrected for a peak wavelength of 530 nm, and thus operates in a telecentric mode when the LEDs of the illuminator 14 are normally powered to emit a peak wavelength of 530 nm. However, by adjusting the current to the same LEDs of the illuminator 14, the peak wavelength emitted by the LEDs can be increased to 540 nm, which is beyond the range through which the telecentric imaging system is corrected. Therefore, the telecentric imaging system 30 behaves in a non-telecentric manner as a result of chromatic aberration. Although the departure in peak wavelength beyond the corrected range affects the geometric positions of image points in the image field as a form of magnification and higher order distortion, the wavelength departure is limited to preserve image sharpness through substantially the same depth of field. As such, the resulting distortions are clearly measurable as changes in image feature size within the image field.

The processor 28 is preferably arranged for controlling the shift between telecentric and non-telecentric modes, such as by controlling the current delivered to the LEDs of the illuminator 14. The processor 28 can also be arranged to perform the various steps required to acquire the desired size measurements in the two modes, measure or effect desired relative displacements between the camera 12 and the object 24, access or derive information concerning the function by which the size of the image feature 25 changes through the depth of field, and perform the required calculations for relating the measures of the size of the imaged feature 25 in the telecentric and non-telecentric modes to each other and to the function by which the size of the imaged feature varies with the relative displacement of the object 24 through the depth of field as an estimate of a relative displacement of the object 24 from a best focus position.

At a first object position $Z_1$ at an undetermined distance from the best focus position along the Z axis within the depth of field, the object feature 25 is measured by the measuring machine 10 operating in a telecentric mode at 530 nm as having an image height $h_0$ of 20 millimeters (mm), which is calibrated as the true height of the feature 25. Since the telecentric imaging system 30 operates in a telecentric mode, the measured image height of the feature 25 is expected to remain constant throughout the depth of field. With respect to the exemplary measuring machine 10, this is same type of measurement for which the measuring machine 10 is designed to take while operating for its intended purpose. Thus, no special form of data collection or interpretation is required to take this measure.

Although the distance from the best focus position is initially undetermined, the $Z_1$ position of the object 24 relative to the telecentric imaging system 30 is preferably selected based on a known relative position between the camera 12 and the table 26 and expected dimensions of the object 24. The available information, which can be drawn by the processor 28 from accessible memory, is preferably adequate to initially relatively position the object 24 within the depth of field and more preferably to relatively position the object 24 proximate to the center of the depth of field.

At the same $Z_1$ position, current to the LEDs of the illuminator 14 is altered to shift the peak wavelength emitted by the LEDs to 540 nm for operating the same telecentric imaging system 30 in a non-telecentric mode. The image height measurement $h_1$ of the same feature 25 at the same $Z_1$ position is returned at 19.99677499 mm, yielding a difference $\Delta h_1$ of −0.0032250120 mm. While the peak wavelength can be displaced in other ways such as by filtering, the shift in wavelength, as a way to operate the telecentric imaging system 30 in a non-telecentric mode, is preferably carried out without mechanically displacing parts of the imaging system so that the telecentric imaging system 30 is otherwise unaffected by the change and can be restored to its normal telecentric operating mode without requiring realignment or other corrective actions associated with mechanical displacements. The illuminator 14, such as the depicted ring light, also preferably remains fixed with respect to the telecentric imaging system 30 to further reduce variability between measurement modes so that the departure from telecentricity is limited to the intended shift in wavelength.

The object 24 can be relatively shifted by a known amount to a second position $Z_2$ within the depth of field, such as by translating the carriage 16 together with the camera 12 along the vertical Z-axis and measuring the displacement. The relative displacement is preferably a predetermined amount that is expected to be within the depth of field. The measurement of the displacement along the vertical Z-axis, which can provide feedback for confirming the desired displacement, is also preferably a conventional feature of the measuring machine 10. Given a relatively large depth of field in the vicinity of ±50 mm, a displacement of 10 mm from the $Z_1$ position is expected to remain within the depth of field. However, if the shift relatively positions the object feature 25 beyond the depth of field, i.e., beyond the range of measurement qualified for the machine 10, an opposite direction of displacement along the Z-axis can be effected to secure a second measurement in the non-telecentric mode.

At a vertical displacement of the carriage 16 by 10 mm, a second image height measurement $h_2$ of the feature 25 is taken in the non-telecentric mode with the peak wavelength emitted by the LEDs remaining at 540 nm. A value of $h_2$ is returned at 19.99570021 yielding a height difference $\Delta h_2$ with respect to the telecentric mode of −0.0042997860 mm. The greater height difference suggests that the displacement from $Z_1$ to $Z_2$ was in the wrong direction with respect to the best focus position.

The change in height difference $\Delta h_2 - \Delta h_1$ of −0.001074774 mm, which is equivalent to the change in height $h_2 - h_1$, with respect to the relative change in object distance $Z_2 - Z_1$ of 10 mm yields a slope $m_r$ of −0.0001074774. Assuming that the local change in magnification varies linearly through the depth of focus in the non-telecentric operating mode, an estimated displacement from the closer initial $Z_1$ position is found by dividing the negative of the height difference $\Delta h_1$ of 0.0032250120 mm by the slope $m_r$ of −0.0001074774 yielding a displacement $Z_3 - Z_1$ of −30.00642 mm to the position at which the height difference $\Delta h_a$ between the telecentric and non-telecentric measurements is equal to zero.

The estimated displacement of −30.00642 mm is actually 0.00642 mm or approximately 6 microns (µm) from a −30.000 mm displacement to the actual best focus position for the given example. This accuracy is sufficient to maintain the object 24 within the depth of field through virtually any practical change in the magnification of the telecentric imaging system. Although a lateral component of the chromatic aberration produced at the shifted wavelength is expected to affect image size at the best focus position negating the assumption that the measured image heights should be the same between the telecentric and non-telecentric modes at the best focus position, the small 10 nm difference in wavelength is not expected result in a significant image height difference of the measured feature between the two measurement modes at the best focus position. In fact, the 10 nm difference in peak wavelength is still expected to be within the bandwidth of a typical LED emitter useful for machine vision systems.

Instead of relatively displacing the object 24 along the Z axis for taking a second measurement in the non-telecentric mode, the approximate slope $m_r$ for a given image height can be determined by optically modeling the telecentric imaging lens 30 using modeling software such as a ray tracing algorithm such as, but not limited to, Zemax® software from Zemax, LLC of Redmond, Wash. or CODE V® optical design software from Synopsys, Inc. of Pasadena, Calif., or by earlier recorded measurements between relatively displaced positions of another object. Different slopes $m_r$ can be stored for different radial zones "r" of the image field to accommodate the effects of higher order radial distortion. However, where higher order distortion is known to be minimal or only a more general approximation of the best focus position is required, a single normalized slope M can be used to define the rate of change in magnification with object distance through the depth of field in the non-telecentric mode.

In the $Z_1$ position, a single measurement can be taken in the telecentric mode to measure the image height $h_0$ of the object feature 25 and a single measurement can be taken in the non-telecentric mode to measure the image height $h_1$ of the same object feature 25. A plurality of slopes $m_r$ corresponding to different radial zones of the image field can be stored in a lookup table accessible from memory by the processor 28 or otherwise mathematically referenced (e.g., a fitted equation) to provide a value for the slope $m_r$ at the image height $h_0$. Given the difference in image height $\Delta h_1$ corresponding to the height difference $h_1-h_0$ and the slope $m_r$ corresponding to a rate of change of image height with relative displacement of the object 24 along the Z axis within the depth of field, an amount of relative object displacement $Z_2-Z_1$ can be predicted for approaching the best focus position as follows:

$$Z_2 - Z_1 = \frac{-\Delta h_1}{m_r} \quad (4)$$

If desired, a second measurement can be made in the non-telecentric mode at the predicted best focus position to confirm that the measured height difference between the two modes is minimal or otherwise corresponds to a height difference expected as a result of lateral chromatic aberration. Particularly for wavelengths that depart more significantly from the corrected range, the expected height differences between the two modes at the best focus position as a lateral component of chromatic aberration can also be stored and accessed for better estimating the amount of relative object displacement required to reach the best focus position.

If the measured image height difference $\Delta h_2$ between the two modes at the first estimated position $Z_2$ of the best focus differs significantly from zero or from the height difference expected as a result of lateral chromatic aberration, a second empirically derived estimate can be calculated for estimating the remaining relative object displacement $Z_3-Z_2$ to the best focus position. Similar to the example above in which two image height measurements are taken in the non-telecentric mode at different relative object positions $Z_1$ and $Z_2$, a new empirically defined slope $m_{r2}$ can be calculated as follows:

$$m_{r2} = \frac{h_2 - h_1}{Z_2 - Z_1} = \frac{\Delta h_2 - \Delta h_1}{Z_2 - Z_1} \quad (5)$$

Based on this new slope a further estimate of the remaining displacement $Z_3-Z_2$ to the best focus position defined as a position at which the measures of image height match between the two operating modes can be calculated according to the following relationship:

$$Z_3 - Z_2 = \frac{-\Delta h_2}{m_{r2}} \quad (6)$$

However, if a significant difference in the measures of image height between the two modes at the best focus position is expected as a result of lateral chromatic aberration $\delta h_r$, such as derived from modeling or prior measurements and scaled to radial position in the image field, the calculated displacement $Z_3-Z_2$ can be found as follows:

$$Z_3 - Z_2 = \frac{\delta h_r - \Delta h_2}{m_{r2}} \quad (7)$$

Assuming that a change in magnification is the dominate geometric change between relative object displacements in the non-telecentric mode, the normalized slope M characterizing the entire image field can be used in a first estimate of the best focus position following the two modes of measurement at an initial relative object position $Z_2$. The effect of any significant lateral chromatic aberration can also be similarly normalized throughout the field as $\delta H$ corresponding to a simple difference in magnification between the modes at the best focus position. Thus, a first estimate of relative object displacement $Z_2-Z_1$ can be calculated as follows:

$$Z_2 - Z_1 = \frac{\delta H - \frac{\Delta h_1}{h_0}}{M} \quad (8)$$

Although the use of the normalized values for the slope M and/or the offset $\delta H$ provides a coarser estimate of the best focus position than the estimates based on the slopes $m_r$ and offsets $\delta h_r$ that are scaled to different radial positions in the image field, the coarser estimates may be sufficiently accurate in some situations to relatively position the object 24 near enough to the best focus position for operating the measuring machine 10 as desired. For example, the coarser estimate could be sufficiently accurate to accommodate changes in the magnification of the telecentric imaging system (e.g. 10 times the lower magnification) that compress the depth of field by a factor of 10 or more without requiring any finer adjustment of the focus position to remain within the narrower depth of field.

A second measure of image height can be taken in the non-telecentric mode at the estimated focus position $Z_2$ to confirm the accuracy of the estimate. If the accuracy is not sufficient, an empirically defined slope $m_r$ can be calculated from the measurements taken in the two relatively displaced object positions $Z_1$ and $Z_2$, and the calculated slope $m_r$ can be used to calculate a further relative object displacement $Z_3-Z_2$ to the best focus position as described above.

Although a single measurement of image height or size in the telecentric mode at any one relative object position can be representative of image height or size measurements of the same feature at different relative object positions in the telecentric mode, additional measurements can be made of the same object feature at different relative object positions in the telecentric mode for purposes of confirmation or potentially improved accuracy.

Instead of shifting the peak wavelength of the same light source between (a) a peak wavelength within the corrected range and (b) a peak wavelength outside the corrected range, different wavelength light sources (e.g., different color LEDs or LEDs with different bin numbers) could be used for purposes of illumination in the telecentric and non-telecentric modes. That is, one light or set of lights could be used in the telecentric mode, and another light or different set of lights could be used in the non-telecentric mode. The wavelength difference between the modes can be increased, particularly for estimating the best focus positions of telecentric imaging systems with narrow depths of field, so long as the measurements of image height in the non-telecentric mode can be taken with the required accuracy. While the wavelengths generated by the light sources are generally expected to be within the visible range, wavelengths beyond the visible range can also be used, where the refractive index of one or more lens elements in the telecentric imaging system varies with a change in the wavelength to support the operation of the telecentric imaging system in a non-telecentric mode.

In addition to varying the wavelength of illumination, other changes can be made to operate an otherwise telecentric imaging system in a non-telecentric mode. For example, the refractive index of one or more optical components, portions of optical components, or a medium between the optical components can be altered so that the telecentric imaging system is no longer telecentric and, as such, measured image height varies with object distance through the depth of field. Some optical materials exhibit a change in refractive index when exposed to an electric field. For example, certain crystalline solids exhibit a so-called Pockels effect and other optical materials can be effectively subject to a so-called Kerr effect. Temperature and pressure are also known to affect the refractive index of optical materials. Although the change between telecentric and non-telecentric modes is preferably accomplished without mechanical motion to avoid alignment or hysteresis issues, electrically focus-tunable lenses are available that alter lens radii in response to a control current. An optic could also be moved into and out of the optical path or between positions along the optical path of the telecentric imaging system to switch between telecentric and non-telecentric modes.

While the methods and apparatus described above generally provide for estimating a best focus position between a telecentric lens and an object intended for imaging by the lens, the estimate can be useful for other purposes beyond relatively adjusting the object to the best focus position. For example, the estimate can also be useful as a range finder to determine the distance of the object from the lens, such as for assuring adequate clearance exists for relatively moving or removing the object.

While the contemplated optical systems include a telecentric imaging system convertible for use in both a telecentric and non-telecentric mode and a sensor for capturing image information, the systems also preferably provide for measuring the imaged height or size of an object feature, for relatively displacing the object with respect to the telecentric imaging system along a Z axis extending through a depth of field, and for measuring or otherwise gaging the amount of relative motion along the Z axis. Preferably, the contemplated optical systems are a part of an optical measuring machine already equipped with a telecentric metrology camera, a motorized Z axis of measurement, and a processor operating under the control of algorithms for interpreting the image height or size of object features imaged by the camera. Other than operating their telecentric cameras in a non-telecentric mode, the optical measuring machines can be operated for taking measurements as originally designed and calibrated while carrying out procedures described above for estimating the best focus position for the machine. In accordance with the usual programming of such machines, the procedures can be carried out automatically or semi-automatically by invoking pre-programmed routines. One example of a measuring machine series especially suited to the purposes herein is a SNAP large-field-of-view digital measuring machine from Optical Gaging Products, manufactured in Rochester, N.Y.

Although the object intended for reference to the best focus position preferably contains imageable features subject to measurement through the telecentric imaging system, highly reflective parts with little contrast can be referenced relative to the best focus position by projecting a grid onto the object and by measuring imaged features (e.g., points or lines) of the grid.

Variations of the above disclosed embodiments, features within the embodiments, and suggested alternatives will be apparent to those of skill in the art as well as their application in others systems and environments in accordance with the teaching provided for this invention.

The invention claimed is:

1. A method of focusing a telecentric imaging system of a measuring machine comprising steps of:
measuring an image of a feature of an object through the telecentric imaging system in a telecentric operating mode in which a size of the imaged feature remains substantially constant with relative displacement of the object through a depth of field;
measuring an image of the feature of the object through the telecentric imaging system in a non-telecentric operating mode in which the size of the imaged feature varies as a function of the relative displacement of the object through the depth of field;
acquiring a value characterizing the function by which the size of the imaged feature varies with the relative displacement of the object through the depth of field;
relating the measures of the image of the feature of the object in the telecentric and non-telecentric modes to each other and to the acquired value characterizing the function by which the size of the imaged feature varies with the relative displacement of the object through the depth of field as an estimate of a relative displacement of the object from the best focus position; and
relatively displacing the object with respect to the telecentric imaging system by the estimate of the relative displacement of the object from the best focus position.

2. The method of claim 1 including steps of
relatively displacing the object within the depth of field by a known amount, and
measuring an image of the feature of the object through the telecentric imaging system in the non-telecentric at the relatively displaced position of the object.

3. The method of claim 2 in which the steps of measuring an image of the feature of the object through the telecentric imaging system include measuring the sizes of the imaged features, and including a step of comparing a measured variation in the sizes of the imaged features between the relatively displaced positions of the object in the non-telecentric mode to the known relative displacement of the object within the depth of field for defining the value characterizing the function by which the size of the imaged feature varies with the relative displacement of the object through the depth of field.

4. The method of claim 1 in which the step of acquiring a value characterizing the function by which the size of the imaged feature varies includes accessing a predefined value.

5. The method of claim 4 in which the predefined value is one of a plurality of predefined values stored in a lookup table or mathematical representation, and the predefined values vary with radial position within the image field to represent different rates of change in magnification with the relative displacement of the object in the non-telecentric mode.

6. The method of claim 4 including a further step of measuring an image of the feature of the object through the telecentric imaging system in the non-telecentric mode at the relatively displaced position of the object as a first estimate of the best focus position.

7. The method of claim 6 in which the steps of measuring an image of the feature of the object through the telecentric imaging system include measuring the sizes of the imaged features, and including a step of comparing a measured variation in the sizes of the imaged features between the relatively displaced positions of the object in the non-telecentric mode to the estimated relative displacement through which the object is relatively displaced to acquire a refined value characterizing the function by which the size of the imaged feature varies with the relative displacement of the object through the depth of field.

8. The method of claim 7 including further steps of
relating the size of the imaged feature in the telecentric mode and the size of the imaged feature in the non-telecentric mode at the relatively displaced position to each other and to the refined value characterizing the function by which the size of the imaged feature varies with the relative displacement of the object through the depth of field as a finer estimate of a relative displacement of the object from the best focus position, and
relatively displacing the object with respect to the telecentric imaging system by the finer estimate of the relative displacement of the object from the best focus position.

9. The method of claim 1 including steps of
emitting a first light beam for illuminating the object whereby the image of the feature of the object in the telecentric mode is formed with a nominal wavelength of the light beam that is within a range of wavelengths at which the telecentric imaging system is corrected to maintain telecentricity, and
emitting a second light beam for illuminating the object whereby the image of the feature of the object in the non-telecentric mode is formed with a nominal wavelength that is outside the range of wavelengths at which the telecentric imaging system is corrected to maintain telecentricity.

10. The method of claim 9 in which the first and second light beams are emitted from a common light source and in which the step of emitting the second light beam includes changing an amount of current to the light source.

11. The method of claim 9 in which the wavelength outside the corrected range subjects the image of the feature of the object to a chromatic aberration and in which an axial component of the chromatic aberration changes focal lengths of optics within the telecentric imaging system such that an aperture stop of the imaging system is no longer located at a back focus as required to locate an entrance pupil of the imaging system at infinity.

12. The method of claim 11 in which the wavelength at which the telecentric imaging system is operated in a non-telecentric mode is sufficiently close to the range of wavelengths at which the telecentric imaging system is designed to operate in a telecentric mode so that a primary effect is a displacement of image points within the image field without a significant loss in sharpness affecting an ability to measure image feature size within a region at which the depths of field in both the telecentric and non-telecentric modes overlap.

13. A focus system for focusing a telecentric imaging system of a measuring machine comprising:
a camera including a telecentric imaging system and a detector on which images relayed by the telecentric imaging system are formed;
the camera being relatively movable with respect to an object intended for measurement along an optical axis of the telecentric imaging system;
the telecentric imaging system being operable in a telecentric mode in which a size of an imaged feature of the object remains substantially constant with relative displacement of the object through a depth of field;
the telecentric imaging system also being operable in a non-telecentric mode in which the size of the imaged feature varies as a function of the relative displacement of the object through the depth of field;
the telecentric imaging system being adjustable between the telecentric and non-telecentric modes;
a processor arranged for extracting size measurements of the imaged feature from images captured by the detector in both the telecentric and non-telecentric modes; and
the processor also being arranged for relating the measures of the size of the imaged feature in the telecentric and non-telecentric modes to each other and to the function by which the size of the imaged feature varies with the relative displacement of the object through the depth of field as an estimate of a relative displacement of the object from a best focus position.

14. The focus system of claim 13 further comprising:
an illuminator for illuminating the object with light that is collected by the telecentric imaging system for imaging the object onto the detector, wherein
the illuminator is arranged for emitting light having a first peak wavelength within a range of wavelengths at which the telecentric imaging system is corrected for operating the telecentric imaging system in the telecentric mode, and
the illuminator is arranged for emitting light having a second peak wavelength outside the range of wavelengths at which the telecentric imaging system is corrected for operating the telecentric imaging system in the non-telecentric mode.

15. The focus system of claim 14 in which the illuminator is adjustable between emitting light at the first peak wavelength and emitting light at the second peak wavelength for adjusting the telecentric imaging system between the telecentric and non-telecentric modes.

16. The focus system of claim 13 in which the processor is arranged for accessing stored data concerning the function by which the size of the imaged feature varies with the relative displacement of the object through the depth of field.

17. The focus system of claim 16 in which the stored data differs by radial distance from the optical axis to accommodate certain distortions of the image feature in the non-telecentric mode.

18. The focus system of claim 13 in which the processor operates according to an algorithm by which the machine is operated for
capturing images of the feature of the object through the telecentric imaging system in both the telecentric and non-telecentric operating modes at the same relative position between the camera and the object,
relatively displacing the object with respect to the camera by a known distance along the optical axis within the depth of field, and
capturing another image of the feature of the object in the non-telecentric mode at the relatively displaced position of the object with respect to the camera.

19. The focus system of claim 18 in which the processor operates according to a further algorithm for
measuring sizes of the feature within the captured images, and
comparing a variation in the measured sizes of the imaged features between the relatively displaced positions of the object in the non-telecentric mode to the known relative displacement of the object within the depth of field for defining a value characterizing the function by which the size of the imaged feature varies with the relative displacement of the object through the depth of field.

20. The focus system of claim 13 in which the processor is arranged to direct the relative displacement of the object with respect to the camera by the estimate of the relative displacement of the object from a best focus position.

21. A method of measuring a best focus position of a telecentric imaging system comprising steps of:
measuring an image of a feature of an object through the telecentric imaging system in both a telecentric operating mode and a non-telecentric operating mode in which a size of the imaged feature remains substantially constant with relative displacement of the object through a depth of field in the telecentric mode and in which the size of the imaged feature varies as a function of the relative displacement of the object through the depth of field in the non-telecentric mode; and
relating the measures of the images of the feature of the object in the telecentric and non-telecentric modes to each other and to the function by which the size of the imaged feature varies with the relative displacement of the object through the depth of field as an estimate of a relative displacement of the object from the best focus position.

22. The method of claim 21 in which the image of the feature of the object in the telecentric mode is formed with a nominal wavelength that is within a range of wavelengths at which the telecentric imaging system is corrected to maintain telecentricity and in which the image of the feature of the object in the non-telecentric mode is formed with a nominal wavelength that is outside the range of wavelengths at which the telecentric imaging system is corrected to maintain telecentricity.

23. The method of claim 22 in which the step of measuring an image of a feature of an object through the telecentric imaging system includes a sub-step of changing a peak wavelength output from a light source from the nominal wavelength that is within a range of wavelengths at which the telecentric imaging system is corrected to maintain telecentricity to the nominal wavelength that is outside the range of wavelengths at which the telecentric imaging system is corrected to maintain telecentricity.

24. The method of claim 23 in which the sub-step of changing the peak wavelength includes changing an amount of current to a LED light source.

25. The method of claim 22 in which the wavelength outside the corrected range introduces a chromatic aberration into the image of the feature of the object and in which an axial component of the chromatic aberration changes focal lengths of optics within the telecentric imaging system such that an aperture stop of the imaging system is no longer located at a back focus as required to locate an entrance pupil of the imaging system at infinity.

26. The method of claim 25 in which local magnification varies with object distance from the best focus position as a result of an axial component of the chromatic aberration, and magnification changes at the best focus position as a result of a lateral component of the chromatic aberration.

27. The method of claim 26 in which the step of relating provides for identifying an amount of relative displacement of the object whereby an image of the feature of the object measured in the non-telecentric mode is expected to at least approximately exhibit the magnification change induced by the lateral component of the chromatic aberration.

28. The method of claim 21 including steps of
relatively displacing the object within the depth of field by a known amount, and
measuring an image of the feature of the object through the telecentric imaging system in the non-telecentric at the relatively displaced position of the object.

29. The method of claim 28 in which the steps of measuring an image of the feature of the object through the telecentric imaging system include measuring the size of the imaged feature, and including a step of comparing a measured variation in the sizes of the imaged features between the relatively displaced positions of the object in the non-telecentric mode to the known relative displacement of the object within the depth of field for defining a value characterizing the function by which the size of the imaged feature varies with the relative displacement of the object through the depth of field.

30. The method of claim 21 in which the step of relating includes accessing one or more predefined values characterizing the function by which the size of the imaged feature varies with the relative displacement of the object through the depth of field.

31. The method of claim 30 in which the predefined values are stored in a lookup table and vary with radial position within the image field to represent different rates of change in magnification with the relative displacement of the object in the non-telecentric mode.

* * * * *